US010133330B2

(12) United States Patent
Rikitake et al.

(10) Patent No.: US 10,133,330 B2
(45) Date of Patent: Nov. 20, 2018

(54) CLUSTER SYSTEM, CONTROLLER, METHOD FOR CONTROLLING, AND COMPUTER-READABLE RECORDING MEDIUM HAVING STORED THEREIN CONTROLLING PROGRAM THAT OPERATE NODE AT THE COMBINATION OF THE RESPECTIVE LOAD SETTING VALUES THAT SATISFY REQUIRED PERFORMANCE AND LOWERS POWER CONSUMPTION

(71) Applicant: FUJITSU LIMITED, Kawasaki-shi, Kanagawa (JP)

(72) Inventors: Susumu Rikitake, Yokohama (JP); Ikuo Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 378 days.

(21) Appl. No.: 14/995,235

(22) Filed: Jan. 14, 2016

(65) Prior Publication Data

US 2016/0132090 A1 May 12, 2016

Related U.S. Application Data

(63) Continuation of application No. PCT/JP2013/069434, filed on Jul. 17, 2013.

(51) Int. Cl.
*G06F 1/32* (2006.01)
*G06F 9/50* (2006.01)

(52) U.S. Cl.
CPC .............. *G06F 1/32* (2013.01); *G06F 9/5094* (2013.01); *Y02B 60/142* (2013.01); *Y02D 10/22* (2018.01)

(58) Field of Classification Search
None
See application file for complete search history.

(56) References Cited

U.S. PATENT DOCUMENTS 7,100,058 B1 * 8/2006 Tomlinson ................ G06F 1/24 324/426
2004/0030942 A1 2/2004 Barr et al.
(Continued)

FOREIGN PATENT DOCUMENTS

JP 10-187636 7/1998
JP 2004-062246 2/2004
(Continued)

OTHER PUBLICATIONS

International Search Report and Written Opinion of the International Searching Authority (Form PCT/ISA/210, Form PCT/ISA/237), mailed in connection with PCT/JP2013/069434 and dated Aug. 13, 2013 (9 pages).
(Continued)

*Primary Examiner* — Nitin C Patel
(74) *Attorney, Agent, or Firm* — Fujitsu Patent Center

(57) ABSTRACT

The cluster system including a generator that generates reference information in which an estimated consumption power and an estimated performance of a cluster including two or more candidate nodes among the plurality of nodes when the candidate nodes are assumed to be operated at respective load setting values are associated with each other for each of a plurality of combinations of the respective load setting values of the candidate nodes; a load setting value selector that selects a combination of the respective load setting values of the candidate nodes, the combination leading to the estimated performance satisfying a required performance for the cluster and having the lowest consumption power, by referring to the reference information; and an operation controller that operates the candidate nodes at the selected combination of the load setting values. This configuration satisfies the required performance and also reduce the consumption power.

20 Claims, 9 Drawing Sheets

(56) References Cited

U.S. PATENT DOCUMENTS

| | | | | |
|---|---|---|---|---|
| 2005/0038772 | A1 | 2/2005 | Colrain | |
| 2013/0278224 | A1* | 10/2013 | Ofek | H02M 7/219<br>320/137 |
| 2017/0338736 | A1* | 11/2017 | Ofek | H02M 1/4233 |

FOREIGN PATENT DOCUMENTS

| | | |
|---|---|---|
| JP | 2004-078940 | 3/2004 |
| JP | 2006-344162 | 12/2006 |
| JP | 2007-506157 | 3/2007 |
| JP | 2009-193385 | 8/2009 |
| JP | 2013-058257 | 3/2013 |
| WO | 2005/017783 | 2/2005 |

OTHER PUBLICATIONS

Japanese Patent Office Action dated May 16, 2017 for corresponding Japanese Patent Application No. 2015-527104, with Partial English Translation, 6 pages.

* cited by examiner

FIG. 3

| | | CPU UTILIZATION 0% (NO LOAD) | CPU UTILIZATION 50% | CPU UTILIZATION 100% (HEAVY LOAD) | STATE OF WORKING |
|---|---|---|---|---|---|
| NODE 1 | CONSUMPTION POWER (W) | 30 | 40 | 55 | ON |
| | PERFORMANCE (GFlops) | 0 | 25 | 40 | |
| NODE2 | CONSUMPTION POWER (W) | 33 | 45 | 60 | ON |
| | PERFORMANCE (GFlops) | 0 | 28 | 50 | |
| NODE 3 | CONSUMPTION POWER (W) | 15 | 30 | 35 | ON |
| | PERFORMANCE (GFlops) | 0 | 18 | 20 | |

| | RESPONSIVENESS (TIME) |
|---|---|
| CLUSTER RESPONSIVENESS (msec) | 20 |
| NODE RESPONSIVENESS (msec) | 2 |

| INITIALIZED FLAG | ON or OFF |
|---|---|

T3b

| NODE NAME | STATE OF WORKING (ON/OFF) |
|---|---|
| NODE 1 | ON |
| NODE 2 | OFF |
| ... | ... |
| NODE N | ON |

FIG. 6

| WORKING NODE TABLE NUMBER | 1 | 2 | 3 | 4 | 5 | 6 | ··· | n-6 | n-5 | n-4 | n-3 | n-2 | n-1 | n |
|---|---|---|---|---|---|---|---|---|---|---|---|---|---|---|
| CPU UTILIZATION (%) OF NODE 1 | 40 | 50 | 40 | 70 | 30 | 40 | ··· | 100 | 90 | 100 | 100 | 100 | 100 | 100 |
| CPU UTILIZATION (%) OF NODE 2 | 70 | 60 | 70 | 40 | 70 | 60 | ··· | 100 | 100 | 90 | 100 | 100 | 100 | 100 |
| CPU UTILIZATION (%) OF NODE 3 | 10 | 10 | 20 | 20 | 20 | 30 | ··· | 60 | 100 | 100 | 70 | 80 | 90 | 100 |
| TOTAL CONSUMPTION POWER (W) | 100.6 | 101.3 | 101.5 | 101.7 | 101.7 | 101.7 | ··· | 146.0 | 146.5 | 146.7 | 147.0 | 148.0 | 149.0 | 150.0 |
| TOTAL PERFORMANCE (GFlops) | 60.4 | 61.0 | 64.0 | 60.6 | 62.6 | 63.2 | ··· | 108.4 | 107.0 | 105.6 | 108.8 | 109.2 | 109.6 | 110.0 |
| CLUSTER RESPONSIVENESS (ms) | 20.0 | 19.8 | 18.9 | 20.0 | 19.3 | 19.1 | ··· | 11.2 | 11.3 | 11.5 | 11.1 | 11.1 | 11.0 | 11.0 |

T4

CLUSTER SYSTEM, CONTROLLER, METHOD FOR CONTROLLING, AND COMPUTER-READABLE RECORDING MEDIUM HAVING STORED THEREIN CONTROLLING PROGRAM THAT OPERATE NODE AT THE COMBINATION OF THE RESPECTIVE LOAD SETTING VALUES THAT SATISFY REQUIRED PERFORMANCE AND LOWERS POWER CONSUMPTION

CROSS-REFERENCE TO RELATED APPLICATION

This application is a continuation application of International Application PCT/JP2013/069434, filed on Jul. 17, 2013 and designated the U.S., the entire contents of which are incorporated herein by reference.

FIELD

The embodiment discussed herein is directed to a cluster system, a controller, a method for controlling, and a computer-readable recording medium having stored therein a controlling program.

BACKGROUND

A computer system configured to be a cluster (multi-node cluster) system having multiple nodes (server machines) operates the multiple nodes connected to one another via a network such as a Local Area Network (LAN) in parallel with one another.

Such a recent cluster system is enduring an increased cost of consumption power in proportional to improvement in performance of network devices and also to an increase in data to be processed. Accordingly, higher demands arise to save power in a computing system.

A conventional computer system optimizes the performance thereof, maintaining entire amounts of heat and power of the system, by adjusting, for example, the voltage level to be applied to the processor.

[Patent Literature 1] Japanese Laid-open Patent Publication No. 2009-193385

[Patent Literature 2] Japanese Laid-open Patent Publication No. 2004-078940

However, such a conventional computer system has difficulty in satisfying the performance demanded for the system and also in suppressing the consumption power when the working environment of the system is varied.

As one example, vibration may cause interference between nodes placed in the same rack or in contiguous racks and consequently the inter-node interference may degrade the performance of the system. As the above, in cases where the original performance of anode is largely damaged, the system performance degrades and/or the consumption power increases. Furthermore, the system performance is degraded and also the consumption power increases when a particular node fails to degrade the performance thereof and a node is active replaced in regular maintenance while the system is operating.

SUMMARY

According to an aspect of the embodiments, a cluster system includes a plurality of nodes; a generator that generates reference information in which an estimated consumption power and an estimated performance of a cluster including two or more candidate nodes among the plurality of nodes when the candidate nodes are assumed to be operated at respective load setting values are associated with each other for each of a plurality of combinations of the respective load setting values of the candidate nodes; a load setting value selector that selects a combination of the respective load setting values of the candidate nodes, the combination leading to the estimated performance satisfying a required performance for the cluster and having the lowest consumption power, by referring to the reference information; and an operation controller that operates the candidate nodes at the combination of the respective load setting values selected by the load setting value selector.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram denoting a node consumption power/performance table of a cluster system according to an example of the first embodiment;

FIG. 4 is a diagram denoting a responsiveness table of a cluster system according to an example of the first embodiment;

FIG. 5 is a diagram denoting a candidate working node table of a cluster system according to an example of the first embodiment;

FIG. 6 is a diagram denoting a candidate working node combination table of a cluster system according to an example of the first embodiment;

DESCRIPTION OF EMBODIMENT(S)

Hereinafter, a cluster system, a controller, a method for controlling, and a non-transitory computer-readable recording medium having stored therein a controlling program according to a first embodiment will now be detailed with reference to accompanying drawings. The following first embodiment is exemplary and has no intention to exclude various modifications and application of techniques not referred in the first embodiment. In other words, various changes and modifications can be suggested without departing from the spirit of the first embodiment. The drawings do not illustrate therein all the functions and elements included in the embodiment and may include additional functions and elements to those illustrated in the accompanying drawings.

Figure 1:
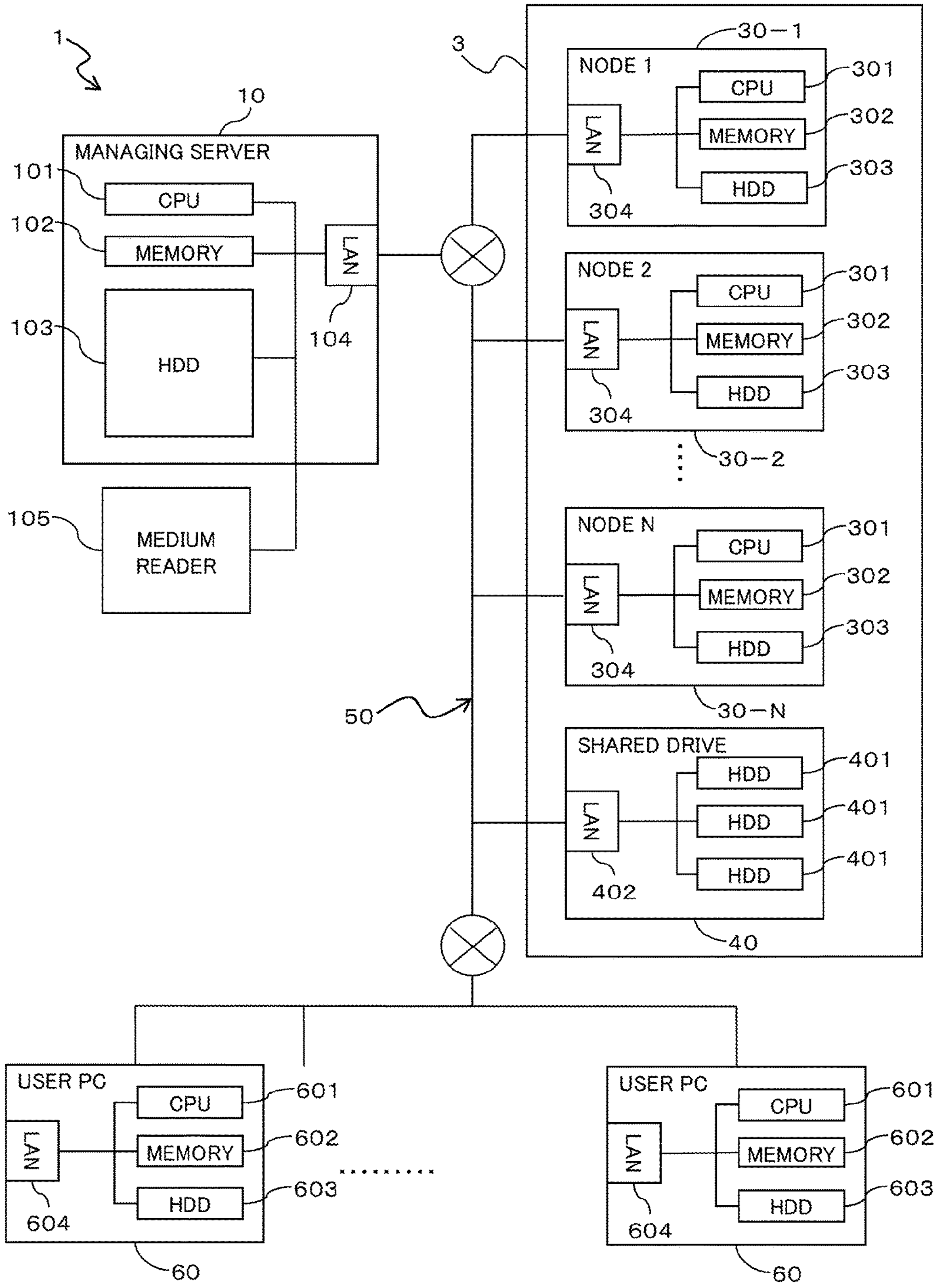
FIG. 1 is a diagram schematically illustrating the hardware configuration of a cluster system according to an example of a first embodiment.
Figure 2:
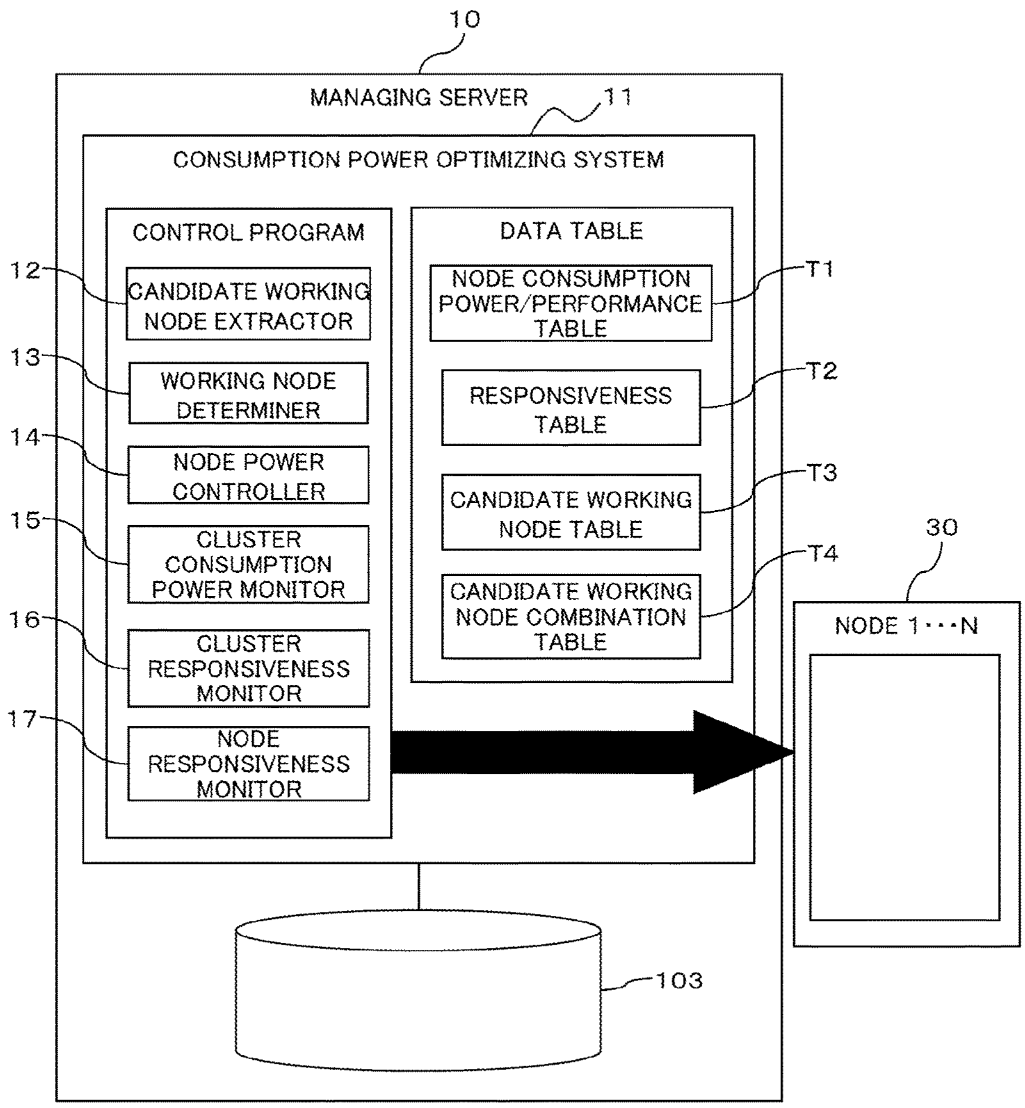
FIG. 2 is a diagram schematically illustrating the functional configuration of a managing server of a cluster system according to an example of the first embodiment.

(A) Configuration:

FIG. 1 schematically illustrates the hardware configuration of a cluster system 1 according to an example of the first embodiment; and FIG. 2 illustrates the functional configuration of a managing server included in the cluster system 1.

The cluster system 1 causes multiple nodes 30 to carry out processing in parallel and thereby can accomplish the processing more rapidly than cases where a single node 30 carries out the processing.

As illustrated in FIG. 1, the cluster system 1 of the first embodiment includes a cluster 3, a managing server 10, and one or more user Personal Computers (PCs) 60. The cluster 3 includes a shared drive 40 and multiple (N, where N is a natural number) of nodes 30-1 to 30-N. The managing server 10, the shared drive 40, the user PCs 60, and the nodes 30-1 to 30-N are communicably connected to one another via a network 50.

A user PC 60 is an information processing apparatus used by the user. For example, the user assigns and inputs a job from the user PC 60. Examples of a job is calculation and web access. A job input from the user PC 60 is transmitted to the cluster 3 and then processed in the cluster 3.

In the example of FIG. 1, two user PCs 60 appear. However, the first embodiment is not limited to this. Alternatively, the cluster system 1 may include one, three or more user PCs 60. The user PCs 60 included in the cluster system 1 have a similar configuration.

As illustrated in FIG. 1, a user PC 60 includes a Central processing unit (CPU) 601, a memory 602, a Hard Disk Drive (HDD) 603, and a Local Area Network (LAN) interface 604, which are connected to one another via a bus that the user PC 60 has.

The memory 602 is a storing device including a Read Only Memory (ROM) and a Random Access Memory (RAM). In the ROM of the memory 602, various software programs and data for the programs are written. The software programs in the memory 602 are occasionally read by the CPU 601, which then executes the programs. The RAM of the memory 602 is used as a primary storing memory or a working memory. The HDD 603 is also a storing device that stores therein the Operating System (OS) and programs executed by the CPU 601 and various pieces of data. The LAN interface 604 is an interface that communicably connects the user PC 60 to the network 50.

The configuration of the user PC 60 is not limited to the above, and various changes and modifications can be applied. For example, the HDD 603 may be replaced by another type of storing device such as a Solid State Drive (SSD).

The cluster 3 includes the shared drive 40 and multiple (N, where N is a natural number) nodes 30-1 to 30-N.

The shared drive 40 is a storing device shared by the nodes 30-1 to 30-N, the user PCs 60, and the managing server 10. The shared drive 40 includes a LAN interface 402 and one or more (three in the example of FIG. 1) HDDs 401.

The HDDs 401 are storing devices that provide the nodes 30-1 to 30-N, the user PCs 60, and the managing server 10 with memory regions. For example, a program and data shared by the nodes 30-1 to 30-N are stored into the shared drive 40.

The nodes 30-1 to 30-N, the user PCs 60, and managing server 10 write and read data into and from the HDDs 401. Here, the multiple HDDs 401 may be formed into a Redundant Arrays of Inexpensive Disks (RAID) system. The LAN interface 402 is an interface that communicably connects the shared drive 40 to the network 50.

The configuration of the shared drive 40 is not limited to the above, and various changes and modifications can be applied. For example, the shared drive 40 may include two or less or four or more HDDs 401, and a HDD 401 may be replaced with another type of storing device such as an SSD.

Each of the nodes 30-1 to 30-N are an information processing apparatus that carries out calculation processing. The nodes 30-1 to 30-N carryout calculation processing in obedience to an instruction from the managing server 10 that is to be detailed below. The nodes 30-1 to 30-N have a similar configuration to one another. Hereinafter, one of the multiple nodes is specified by a reference number from 30-1 to 30-N, but an arbitrary node is represented by a reference number 30.

As illustrated in FIG. 1, each node 30 includes a CPU 301, a memory 302, a HDD 303, and a LAN interface 304, which are connected to one another via a bus that the node 30 has.

The memory 302 is a storing device including a ROM and a RAM. In the ROM of the memory 302, various software programs and data for the programs are written. The software programs in the memory 302 are occasionally read by the CPU 301, which then executes the programs. The RAM of the memory 302 is used as a primary storing memory or a working memory. The HDD 303 is also a storing device that stores therein the OS and programs executed by the CPU 301 and various pieces of data. The LAN interface 304 is an interface that communicably connects the node 30 to the network 50.

The configuration of the node 30 is not limited to the above, and various changes and modifications can be applied. For example, the HDD 303 may be replaced by another type of storing device such as an SSD.

Furthermore, each node 30 has a power capping function and therefore can control the consumption power thereof by operating at a CPU utilization assigned by, for example, the managing server 10. The power capping function controls the operation frequency and the voltage of the server by, for example, modifying the P-state of the CPU and thereby controls the processing capability and the consumption power of the CPU 301.

Upon receipt of a node responsiveness monitoring job issued from the managing server 10 (node responsiveness monitor 17), each node 30 causes the CPU 301 to execute the received node responsiveness monitoring job, and the replies to the managing server 10 with the result of the executing of the job.

The node responsiveness monitoring job is a program to evaluate the calculation performance of each node 30 and causes the CPU 301 to execute a calculation. For example, a known benchmark program can be used as the node responsiveness monitoring job.

In the cluster 3, each node 30 has a function of arbitrarily connecting to or disconnecting from the cluster 3 in obedience to an instruction from the managing server 10 that is to be detailed below. The connection and disconnection of a node 30 to and from the cluster 3 can be achieved by any known manner, so the detailed description is omitted here.

The managing server 10 is, for example, an information processing apparatus having a server function, and controls a consumption power of each node 30 in the cluster system 1.

As illustrated in FIG. 1, the managing server 10 includes a CPU 101, a memory 102, a HDD 103, a medium reader 105, and a LAN interface 104, which are connected to each other via a bus that the managing server 10 has.

The memory 102 is a storing device including a ROM and a RAM. In the ROM of the memory 102, various software programs and data for the programs are written. The software programs (controlling programs) in the memory 102 are occasionally read by the CPU 101, which then executes the programs. The RAM of the memory 102 is used as a primary storing memory or a working memory. In addition, various data tables T1-T4 denoted in FIG. 2 are stored in the RAM.

FIG. 3 is a table denoting a node consumption power/performance table T1 of the cluster system 1 according to an example of the first embodiment.

The node consumption power/performance table T1 represents, in the table form, the relationship (characteristic) between the processing performance and the consumption power of each node 30 in the active state at a certain CPU utilization (load setting value). The node consumption power/performance table T1 of FIG. 3 associates a consumption power (in the unit of W) and a performance (in the unit of GFlops) with each of multiple CPU utilization (in the unit of %).

The example of FIG. 3 denotes three states of the CPU utilization of 0% (no load), 50%, and 100% (heavy load). The node consumption power/performance table T1 registers therein the consumption power and the performance value of each node 30 in multiple (three in this example) steps.

The information registered in the node consumption power/performance table T1 is obtained in advance through, for example, a stress test conducted under a state where each node 30 is operated at the above CPU utilizations. However, the manner of obtaining the node consumption power/performance table T1 is not limited to this, and alternatively, the node consumption power/performance table T1 may be the performance information provided by the manufacturer of the node 30 or the value calculated from the provided performance information.

The node consumption power/performance table T1 is stored in, for example, the HDD 103, and is occasionally read by the memory 102 for future use.

FIG. 4 illustrates a responsiveness table T2 of the cluster system 1 according to an example of the first embodiment.

The responsiveness table T2 denotes, in the table form, the performance value (required performance) required for the cluster system 1, and specifically registers therein a cluster responsiveness (millisecond (msec)) and a node responsiveness (msec). In the example of FIG. 4, the cluster responsiveness is set to be 20 msec, which means that, when a user PC 60 issues a processing request to the cluster system 1, the cluster system 1 has to respond to the user PC 60 within 20 msec. Likewise, in the example of FIG. 4, the node responsiveness is set to be 2 msec, which means that each node 30 has to respond to a processing request issued to the node 30 within 2 msec. It can be said that the responsiveness table T2 represents the thresholds that the cluster system 1 of the first embodiment requires. The information in the responsiveness table T2 is registered in advance, for example, by user.

The responsiveness table T2 is stored in, for example, the HDD 103 and is occasionally read by the memory 102 for future use.

FIG. 5 denotes a candidate working node table T3 of the cluster system 1 according to an example of the first embodiment.

The candidate working node table T3 indicates, in the table form, information as to whether each node 30 satisfies the performance (i.e., node performance) that the cluster 3 requires and therefore can be used for calculation, that is, whether each node 30 can be a candidate working node (candidate node) to constitute the cluster 3 (see reference number T3*b*). In the example of FIG. 5, the node name of a node 30 that can be a candidate working node is set to be "ON" while the node name of a node 30 that is not a candidate working node is set to be "OFF". Additionally, an initialized flag (see the reference number T3*a*) indicating whether the entire candidate working node table T3 has been initialized is set. When the table T3 has been initialized, the initialized flag is set to be "ON" and when the table T3 has not been initialized yet, the initialized flag is set to be "OFF".

The candidate working node table T3 is set by the node responsiveness monitor 17 that is to be detailed below. The candidate working node table T4 will be described below by referring to FIG. 6.

The HDD 103 is a storing device and stores therein the OS and programs (controlling program) executed by the CPU 101 and various pieces of data. Furthermore, in the HDD 103, the node consumption power/performance table T1 and the responsiveness table T2 are stored. The LAN interface 104 is an interface that communicably connects the managing server 10 to the network 50.

The configuration of the managing server 10 is not limited to the above and may be variously modified. For example, the HDD 103 may be replaced with another type of storing device, such as an SSD.

The medium reader 105 is configured to detachably mount thereon a non-illustrated recording medium. The medium reader 105 is configured to read information stored in a recording medium being mounted on the medium reader 105. In the first embodiment, the recording medium is a portable. Examples of the recording medium are computer-readable storage media, such as a flexible disk, a CD (e.g., CD-ROM, CD-R, and CD-RW), a DVD (DVD-ROM, DVD-RAM, DVD-R, DVD+R, DVD-RW, DVD+RW, and HD DVD), a Blu-ray disk, a magnetic disk, an optical disk, a magneto-optical disk, and a semiconductor memory.

The CPU 101 is a processor that carries out various controls and calculations, and achieves various functions by executing the OS and the programs stored in the memory 102. This means that the CPU 101 functions as a consumption power optimizing system 11 as illustrated in FIG. 2. Specifically, the consumption power optimizing system 11 has functions as a candidate working node extractor 12, a working node determiner 13, a node power controller 14, a cluster consumption power monitor 15, a cluster responsiveness monitor 16, and the node responsiveness monitor 17.

A program (program for optimizing the consumption power) to achieve the above functions as the candidate working node extractor 12, the working node determiner 13, the node power controller 14, the cluster consumption power monitor 15, the cluster responsiveness monitor 16, and the node responsiveness monitor 17 is provided in the form of being stored in a recording medium as described above. A computer reads the program from the recording medium via the medium reader 105, and stores the read program in an internal or external storage device for future use. Alternatively, the program may be recorded in a recording device (recording medium) such as a magnetic disk, an optical disk, or a magneto-optical disk, and may be provided from the recording device to the computer via a communication path.

In achieving the functions of the candidate working node extractor 12, the working node determiner 13, the node power controller 14, the cluster consumption power monitor 15, the cluster responsiveness monitor 16, and the node responsiveness monitor 17, the program stored in an internal storage device (corresponding to the memory 102 in the first embodiment) is executed by the microprocessor (corresponding to the CPU 101 in the first embodiment) of the computer. At that time, the computer may read the program stored in the recording medium and then execute the program.

(1) Node Power Controller 14:

The node power controller 14 controls the consumption power of each node 30. Specifically, the node power controller 14 notifies the CPU utilization to each node 30 and thereby operates the node 30 at the notified CPU utilization, using the power capping function of the node 30. Consequently, the node power controller 14 can control the consumption power of the node 30.

(2) Node Responsiveness Monitor 17:

The node responsiveness monitor (node performance measure, node selector) 17 obtains and monitors the performance of each node 30. Specifically, the node responsiveness monitor 17 measures the responsiveness (node performance) of each node 30 by issuing a node responsiveness monitoring job to the node 30 through the network 50 and measuring the response time to the issued job.

As described above, the node responsiveness monitoring job is a program to evaluate the calculation performance of each node 30, and for this purpose, instructs the CPU 101 to execute a certain process. The node responsiveness monitor 17 measures time (response time, observed node performance) that the node responsiveness monitor 17 takes to receive a response to a node responsiveness monitoring job from a node 30 after issuing the job to the node 30.

Then the node responsiveness monitor 17 compares the response time from each node 30 and the node responsiveness registered in the responsiveness table T2. If the measured response time of a node 30 satisfies the node responsiveness, in other words, if the measured response time is shorter than the node responsiveness, the node responsiveness monitor 17 sets the state of working of the node 30 in the candidate working node table T3 to be "ON". In contrast, if the response time of a node 30 does not satisfy the node responsiveness, in other words, if the measured response time is equal to or longer than the node responsiveness, the node responsiveness monitor 17 sets the state of working of the node 30 in the candidate working node table T3 to be "OFF", and disconnects the node from the cluster system 1.

Thereby, the node responsiveness monitor 17 sets a candidate working node on the candidate working node table T3. Specifically, the node responsiveness monitor selects a candidate node according to whether the observed responsiveness of each node 30 measured by issuing the node responsiveness monitoring job satisfies the node responsiveness (required performance).

The node responsiveness monitor 17 obtains the state of working of each node 30 by monitoring the node 30. The node responsiveness monitor 17 receives an instruction to obtain the state of working of a node 30 from the candidate working node extractor 12 that is to be detailed below, notifies the node responsiveness monitoring node to each node 30, and then waits for a response from the each node 30.

If receiving a response from each node 30, the node responsiveness monitor 17 carries out the following process. Namely, the node responsiveness monitor 17 measures a response time (observed node performance) from the node 30 after issuing the node responsiveness monitoring job. Then the node responsiveness monitor 17 compares the observed node performance with the node responsiveness registered in the responsiveness table T2.

If the response time of a node 30 satisfies the node responsiveness and the state of working of the same node 30 is set to be "OFF" in the candidate working node table T3, the node responsiveness monitor 17 changes the working state of the node 30 to "ON" and connects the node 30 to the cluster 3.

In contrast, if the response time of a node 30 does not satisfy the node responsiveness and the state of working of the same node 30 is set to be "ON" in the candidate working node table T3, the node responsiveness monitor 17 changes the working state of the node 30 to "OFF" and disconnects the node 30 from the cluster 3.

(3) Cluster Consumption Power Monitor 15:

The cluster consumption power monitor 15 obtains and monitors the consumption power of the cluster 3. Specifically, the cluster consumption power monitor 15 obtains, for example, the respective consumption powers from the nodes 30 constituting the cluster 3 and sums the obtained consumption powers. The consumption power of the cluster 3 can be obtained and monitored in any known manner, so the detailed description thereof is omitted here.

(4) Candidate Working Node Extractor 12:

The candidate working node extractor 12 generates the candidate working node table T4 (reference information) denoted in FIG. 6.

FIG. 6 is a diagram denoting the candidate working node table T4 of the cluster system 1 according to an example of the first embodiment.

The candidate working node table T4 denotes an estimated consumption power and an estimated performance when two or more nodes 30 (candidate nodes) selected from the multiple (N) nodes 30 are assumed to be operated at respective CPU utilizations (load setting values). The candidate nodes 30 registered in the candidate working node table T4 are the nodes 30 for which the state of working in the candidate working node table T3 is set to be "ON" by the cluster responsiveness monitor 16 described above.

In the example of FIG. 6, the candidate working node table T4 operates three candidate nodes 30 having the node names of node 1 to node 3 at CPU utilizations selected from 10%, 20%, 30%, 40%, 50%, 60%, 70%, 80%, 90%, and 100%, which are in the range of 0-100% at intervals of 10%.

Hereinafter, a combination of the CPU utilizations of the candidate nodes 30 are referred to as a set of load setting values. In the example of FIG. 6, a working node table number is set to specify each set of load setting values.

The CPU utilizations set in the candidate working node table T4 is not limited to values at intervals of 10%, that is, 10%, 20%, 30%, 40%, 50%, 60%, 70%, 80%, 90%, and 100%. Alternatively, the CPU utilizations may be values at intervals smaller or larger than 10%, and therefore various modifications can be suggested.

The candidate working node table T4 sets therein estimation values of an total consumption power (unit: W) of the cluster system 1, the total performance (unit: GFlops) of the cluster system 1, and the cluster responsiveness (unit: ms) of the cluster system 1 when the candidate nodes 30 are assumed to be operated at the respective CPU utilizations in a set of load setting values (working node table number).

Here, description will now be made in relation to the method of generating the candidate working node table T4 by the candidate working node extractor 12.

(4-1) The candidate working node extractor 12 reads the consumption power and the performance value of each CPU utilization of each node 30 from the node consumption power/performance table T1. The candidate working node extractor 12 further reads the responsiveness table T2.

(4-2) Next, the candidate working node extractor 12 obtains an expression of the approximation curve representing the relationship between the consumption power and the performance value of each node 30. Specifically, the candidate working node extractor calculates the factors ($\alpha_n$, $\beta_n$, $\gamma_n$) in the following expression (1). When the number of data pieces is N, the approximation curve is defined as an (N−1)th-order function.

$$P_n=\alpha_n W_n^{2}+\beta_n W_n+\gamma_n \quad (1)$$

Where, $P_n$: performance value of node n
$W_n$: consumption power of node n
$\alpha_n$: quadric function of node n
$\beta_n$: linear function of node n
$\gamma_n$: factor of node n The candidate working node extractor 12 generates three equations regarded as the following expression (2) by substituting the consumption power and the performance value at each CPU utilization (0%, 50%, and 100%) of each node 30 registered in the node consumption power/performance table T1 into the expression (1).

$$0=\alpha_n\times(30)^2+\beta_n\times(30)+\gamma_n$$

$$25=\alpha_n\times(40)^2+\beta_n\times(40)+\gamma_n$$

$$40=\alpha_n\times(55)^2+\beta_n\times(55)+\gamma_n \quad (2)$$

The candidate working node extractor 12 solves the simultaneous equations to obtain the factors $\alpha_n$, $\beta_n$, and $\gamma_n$, and thereby calculates an approximation curve representing the relationship between the consumption power and the performance value.

Obtaining the factors in the expression (1) by obtaining the factors of the expression (2) and expressing the consumption power and the performance value in symbols W and P, respectively, derive the following expression (3).

$$P=-0.06\ W^2+6.7\ W-147 \quad (3)$$

Figure 7:
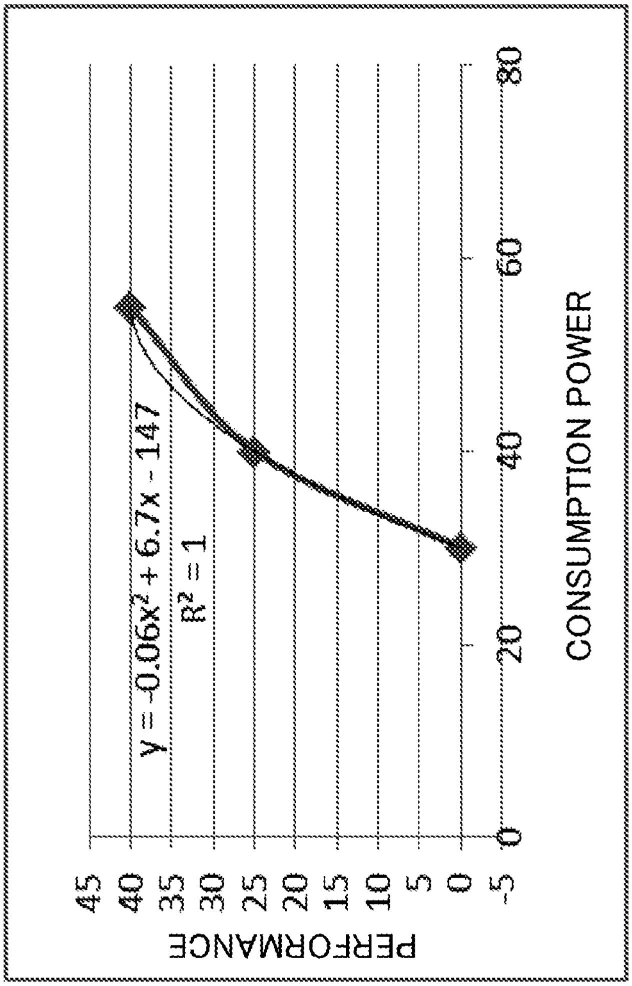
FIG. 7 is a graph denoting the relationship between consumption power and the performance.

FIG. 7 is a diagram denoting the relationship between the node consumption power and the performance, and specifically is a graph representing the above expression (3). As illustrated in FIG. 7, the expression (3) can express the relationship between the node consumption power and the performance in an approximation curve.

The candidate working node extractor 12 obtains an approximation curve representing the relationship between the consumption power and the performance, the relationship corresponding to the expression (3), of each remaining node 30 using the consumption powers and the performance values at respective CPU utilizations by referring to the node consumption power/performance table T1.

(4-3) The candidate working node extractor 12 extracts all the nodes 30 the state of working of which is set to be "ON", that is, all the candidate working nodes, by referring to the candidate working node table T3, and connects all the candidate working nodes to the cluster 3.

The candidate working node extractor 12 sets "OFF" in the initialized flag of the candidate working node 30 table T3.

(4-4) The candidate working node extractor 12 instructs, via the node power controller 14, all the candidate working nodes to start their operation at the CPU utilization of 100% (heavy load).

The candidate working node extractor 12 causes the node responsiveness monitor 17 to issue a node responsiveness monitoring job to each node 30 and measure the respective response times. Then the node responsiveness monitor 17 compares the measured response times with the node responsiveness in the responsiveness table T2 and, on the basis of the result of the comparing, sets the state of working of the node 30 to be "ON" or "OFF" in the candidate working node table T3. In other words, if the measured response time of a node 30 satisfies the node responsiveness, the node responsiveness monitor 17 sets the state of working of the node 30 to be "ON" while, if the measured response time of a node 30 does not satisfy the node responsiveness, the node responsiveness monitor sets the state of working of the node 30 to be "OFF" and disconnects the node 30 from the cluster 3. In the above manner, the candidate working node extractor 12 determines the candidate nodes constituting the cluster 3.

(4-5) The candidate working node extractor 12 sets, in the candidate working node table T3, various combinations (sets of load setting values) of CPU utilizations at which the nodes 30 that have been set to be the working nodes by the node responsiveness monitor in the candidate working node table T3.

The candidate working node extractor 12 calculates estimated values of the total consumption power, the total performance value, and the cluster performance when the nodes 30 are assumed to be operated at respective CPU utilizations belonging to the same combination on the candidate working node table T3 and then sets the estimated values into the candidate working node table T3.

At that time, the candidate working node extractor 12 calculates total performance value and the total consumption power of each combination of CPU utilizations of the nodes 30 using the factors obtained by the expression (2) and the following expressions (4) and (5).

The expression (4) calculates the total consumption power $W_{total}$ of the N nodes and the expression (5) calculates the total performance value $P_{total}$ of the N nodes.

$$P_{total}=\sum_{n=1}^{n=N}\alpha_n W_n^2+\beta_n W_n+\gamma_n \quad (4)$$

$$W_{total}=\sum_{n=1}^{n=N}W_n \quad (5)$$

where $P_{total}$: total sum of performance values of all the working nodes (total number N)
$W_{total}$: total sum of consumption powers of all the working nodes (total number N)
$P_n$: performance value of node n
$W_n$: consumption power of node n
$\alpha_n$: quadric factor of node n
$\beta_n$: linear factor of node n
$\gamma_n$: factor of node n The candidate working node extractor 12 equally divides the difference between the maximum value (at the CPU utilization of 100%) and the minimum value (at the CPU utilization of 0%) of the consumption power of each node 30 into, for example, nine (i.e., intervals of 10%) by referring to the node consumption power/performance table T1. This estimates (calculates) consumption powers of each node 30 at the CPU utilizations of 90%, 80%, 70%, 60%, 40%, 30%, 20%, and 10% as the supplements to the consumption powers between CPU utilizations of 100% and 50% and between 50% and 0% of the node consumption power/performance table T1.

Then the candidate working node extractor 12 applies the ten-step consumption powers of each node 30 estimated as the above to the expression (4), so that the sum (estimated value) of the performance values of all the candidate working nodes operating at each combination of CPU utilizations is calculated. Hereinafter, the sum (estimated value) of the performance values of all the candidate working nodes is sometimes referred to as the total performance value.

The candidate working node extractor 12 applies various combinations of the consumption powers of the respective nodes 30 which powers have been estimated in 10-steps as the above to the expression (5) to calculate the total sum (estimated value) of the consumption powers of all the working nodes for various combinations of CPU utilizations. Hereinafter, the sum of the consumption powers is sometimes referred to as the total consumption power of all the candidate working nodes.

The candidate working node extractor 12 registers the total performance value and the total consumption power that are calculated as the above in association with the combination of CPU utilizations of the respective nodes 30 in the candidate working node table T4.

Specifically, the candidate working node extractor 12 varies the respective consumption powers $W_1, W_2, \ldots,$ and $W_n$ of the N nodes of the expression (4) in ten steps, and lists all the combination (10N combinations) of the CPU utilizations of the candidate working nodes and the respective corresponding performance values.

In the above example, the consumption power value of each node 30 are divided into the ten steps (i.e., intervals of 10%) between the maximum value and the minimum values of the consumption power of the node 30. However, the first embodiment is not limited to this and various changes and modifications can be suggested. Alternatively, the consumption power of each node 30 may be divided into eleven steps or more, so that the power-saving control can be precisely accomplished. In contrast, the consumption power of each node may be divided into nine steps or less, so that the time for generating the candidate working node table T4 can be shortened.

When the state of working in the candidate working node table T3 is changed, the candidate working node extractor 12 regenerates the candidate working node table T4.

Furthermore, the candidate working node extractor 12 sorts the combinations of the CPU utilizations of the respective node 30 in an ascending order of the total consumption power, that is, from the lowest power, in the candidate working node table T3. This means that the consumption power comes to be larger as the working node table number increases while the consumption power as the working node table number decreases.

(4-6) The candidate working node extractor 12 sets a cluster responsiveness in the candidate working node table T4.

When the initialized flag of the candidate working node table T3 is set to be "OFF", the candidate working node extractor 12 sets the initialized flag into "ON" and then carries out the following process.

The candidate working node extractor 12 causes the cluster responsiveness monitor 16 that is to be detailed below to obtain an observed cluster responsiveness under a state where the nodes 30 constituting the cluster 3 are working at the CPU utilization of 100%.

Upon receipt of an instruction of obtaining the state of working of the cluster 3 from the candidate working node extractor 12, the cluster responsiveness monitor 16 issues a cluster responsiveness monitoring job (that is to be detailed below) to the cluster 3 through the network 50.

The cluster responsiveness monitor 16 issues a cluster responsiveness monitoring job under a state where the nodes 30 constituting the cluster 3 are working at the CPU utilization of 100%, waits for a response from the cluster 3, and measures an observed cluster responsiveness (that is to be detailed below).

The candidate working node extractor 12 obtains the observed cluster responsiveness from the cluster responsiveness monitor 16, and sets the obtained performance into the cluster responsiveness of the CPU utilization of 100% (high load) in the candidate working node table T4.

If the initialized flag in the candidate working node table T3 is set to be "OFF", obtaining the observed cluster responsiveness at the CPU utilization of 100% is omitted.

The candidate working node extractor 12 calculates the cluster responsiveness of each combination of CPU utilizations in the candidate working node table T4 using the cluster responsiveness of the CPU utilization of 100% (heavy load) in the candidate working node table T4.

More specifically, the candidate working node extractor 12 calculates, using the following expression (6), a cluster responsiveness of each combination of CPU utilizations based on the total performance when the nodes 30 are operating at the CPU utilization of 100% (heavy load) and on the total performance of each combination by referring to the candidate working node table T4.

$$\text{Cluster responsiveness of each combination} = (\text{total performance at CPU utilization of } 100\% / \text{the total performance of the each combination}) \times \text{cluster responsiveness at CPU utilization of } 100\% \quad (6)$$

For example, the CPU utilizations of each node 30 of the working node table number n is 100% in the candidate working node table T4. The cluster responsiveness of the working node table number n−6 is calculated using the expression (6) as follows.

$$(110 \div 108.4) \times 11.0 \approx 11.1611.2$$

The candidate working node extractor 12 calculates the cluster responsiveness of each set of load setting values (working node table number) of the candidate working node table T4 using the expression (6), and sets the calculated cluster responsiveness in the candidate working node table T4.

The generation of the candidate working node table T4 is completed in the above process.

(5) Working Node Determiner 13:

The working node determiner 13 determines a CPU utilization of each node 30, considering the working state of the cluster 3, by referring to the responsiveness table T2 and candidate working node table T4. Specifically, the candidate working node extractor 12 extracts the combination of CPU utilizations that satisfies the cluster responsiveness registered in the responsiveness table T2 and also has the lowest total consumption power among all the combinations of CPU utilization registered in the candidate working node table T4, and obtains the working node table number associated with the selected combination.

Then the working node determiner 13 obtains the CPU utilization of each node 30 associated with the obtained working node table number from the candidate working node table T4, and sets the obtained CPU utilization in the node 30 through the node power controller 14.

The node power controller 14 receives the CPU utilizations set by the working node determiner 13 and notifies the CPU utilizations to the respective nodes 30 via the network 50. Each node 30 controls the consumption power thereof using the power capping function in accordance with the notified CPU utilization.

The node responsiveness monitor 17 and the cluster responsiveness monitor 16 monitor the node performance of each node 30 and the cluster performance of the cluster 3, respectively, and measure the performances and the consumption powers periodically (at periodic monitoring intervals).

The cluster responsiveness monitor 16 monitors the state of working of the cluster 3, and periodically measures the performance and the consumption power of the cluster 3. The cluster responsiveness monitor 16 sets the CPU utilization of each node 30 on the basis of the performance and the consumption power of the cluster 3.

As described above, the state of working of the cluster 3 varies due to, for example, the following change in the working environmental of the cluster 3.

(a) When vibration causes interference between nodes 30 placed in the same rack or in contiguous racks and consequently the inter-node interference largely degrades the original performance of an individual node 30, the cluster undergoes lowering of the performance thereof or increasing of the consumption power.

(b) When a particular node fails to degrade its performance while the system is operating and therefore the original performance of an individual node 30 largely degraded, the cluster undergoes lowering of the performance thereof or increasing of the consumption power.

(c) When a node is active replaced in, for example, regular maintenance, the cluster undergoes lowering of the performance thereof or increasing of the consumption power.

(6) Cluster Responsiveness Monitor 16:

The cluster responsiveness monitor 16 obtains and monitors the performance of the cluster 3. For example, the cluster responsiveness monitor 16 issues a cluster responsiveness monitoring job to the cluster 3 via the network 50.

A cluster responsiveness monitoring job is a job to evaluate the processing performance of the cluster 3. For example, if the cluster 3 functions as a web server, a HyperText Markup Language (HTML) web display request is used as the cluster responsiveness monitoring job.

After issuing a cluster responsiveness monitoring job to the cluster 3, the cluster responsiveness monitor 16 measures time (response time) that the cluster responsiveness monitor 16 takes to receive the response to the cluster responsiveness monitoring job. The response time may be sometimes referred to as an observed cluster responsiveness.

The cluster responsiveness monitor 16 compares the response time from the cluster 3 with the cluster responsiveness registered in the responsiveness table T2. If the measured response time satisfies the cluster responsiveness, in other words, if the measured response time is less than the cluster responsiveness, the cluster responsiveness monitor 16 determines that the cluster responsiveness is satisfied. In accordance with the result of the comparing, the cluster responsiveness monitor 16 carries out the following processes (6-1) to (6-3).

(6-1) If the observed cluster responsiveness is not included in an allowable range of the cluster responsiveness of the responsiveness table T2, the cluster responsiveness monitor 16 calculates an updated cluster responsiveness.

Specifically, when the observed cluster responsiveness is not included in a predetermined range (e.g., ±10%) centered at the cluster responsiveness registered in the responsiveness table T2, the cluster responsiveness monitor 16 compares the observed cluster responsiveness and the cluster responsiveness associated with the working node table number. After that, the cluster responsiveness monitor 16 calculates the updated cluster responsiveness based on the ratio of varying the responsiveness, using the following expression (7).

$$\text{updated cluster responsiveness}=(\text{cluster responsiveness of the responsiveness table } T2/\text{observed cluster responsiveness})\times\text{cluster responsiveness corresponding to working node table number} \quad (7)$$

For example, while the system operating at the combination of the CPU utilizations of the working node table number 5 in the candidate working node table T4, the corresponding cluster responsiveness is 19.3 msec. It is assumed that the cluster responsiveness (expected responsiveness) of the responsiveness table T2 is 20 msec while the observed cluster responsiveness is 23 msec.

In the first embodiment, the observed responsiveness (23 msec) is larger than the expected responsiveness (20 msec). Furthermore, the observed cluster responsiveness (23 msec) does not satisfy the allowable range (e.g., ±10%) of the cluster responsiveness (20 msec) in the responsiveness table T2. For the above, the cluster responsiveness monitor 16 calculates an updated cluster responsiveness using the above expression (7).

$$\text{updated cluster responsiveness}=(20\div 23)\times 19.3\approx 16.8 \text{ msec}$$

The cluster responsiveness monitor 16 extracts a combination of CPU utilizations which obtains the cluster responsiveness satisfying (i.e. having a smaller value than) the updated cluster responsiveness (16.8 msec) calculated as the above, and obtains the working node table number associated with the combination. At this time, the cluster responsiveness monitor 16 selects a combination of CPU utilization having a lower total consumption power.

The cluster responsiveness monitor 16 obtains, from the candidate working node table T4, a combination satisfying the updated cluster responsiveness calculated as the above and also having the lowest total consumption power.

(6-2) If the observed cluster responsiveness satisfies the cluster responsiveness and also the observed cluster consumption power is higher than the total consumption power of the contiguous working node table number larger by one than that associated with the extracted combination in the candidate working node table T4, the cluster responsiveness monitor 16 sets the contiguous working node table number.

As described above, the combinations of CPU utilizations registered in the candidate working node table T4 are sorted on the basis of the consumption power so as to have larger consumption power as the working node table number comes to be larger.

The cluster responsiveness monitor 16 compares the consumption power (observed consumption power) when being obtained by the cluster consumption power monitor 15 with the total consumption power of the contiguous working node table number one-step ascending to (larger by one than) the working node table associated with the combination of CPU utilizations selected (achieved) by that time.

When the observed consumption power is higher than the total consumption power of the one-step-ascending working node table number, the cluster responsiveness monitor 16 selects the one-step-ascending working node table number and causes the node power controller 14 to operate the nodes 30 at the respective CPU utilizations associated with the selected working node table number. This makes it possible to lower the consumption power of the cluster 3.

(6-3) If the observed cluster responsiveness satisfies the cluster responsiveness and also the observed cluster consumption power is lower than the total consumption power of the contiguous working node table number smaller by one than that associated with the extracted combination in the candidate working node table T4, the cluster responsiveness monitor 16 sets the contiguous working node table number.

As described above, the combinations of CPU utilizations registered in the candidate working node table T4 are sorted on the basis of the consumption power so as to have smaller consumption powers as the working node table number comes to be smaller.

The cluster responsiveness monitor 16 compares the observed consumption power obtained by the cluster consumption power monitor 15 with the total consumption power of the contiguous working node table number one-step descending to (smaller by one than) the working node table associated with the combination of CPU utilizations selected (achieved) by that time.

When the observed consumption power is lower than the total consumption power of the one-step-descending working node table number, the cluster responsiveness monitor 16 selects the one-step-descending working node table number and causes the node power controller 14 to operate the nodes 30 at the respective CPU utilizations associated with the selected working node table number. This cause the nodes 30 to operate at the combination of CPU utilization which can decrease the consumption powers than those of the current consumption power, so that the respective consumption powers can be lower.

If the current state does not correspond to any of the above (6-1) to (6-3), the cluster responsiveness monitor 16 waits until the next periodic monitoring time comes, that is, waits for measuring each node performance and the cluster performance by the node responsiveness monitor 17 and the cluster responsiveness monitor 16 for the next time.

Figure 8:
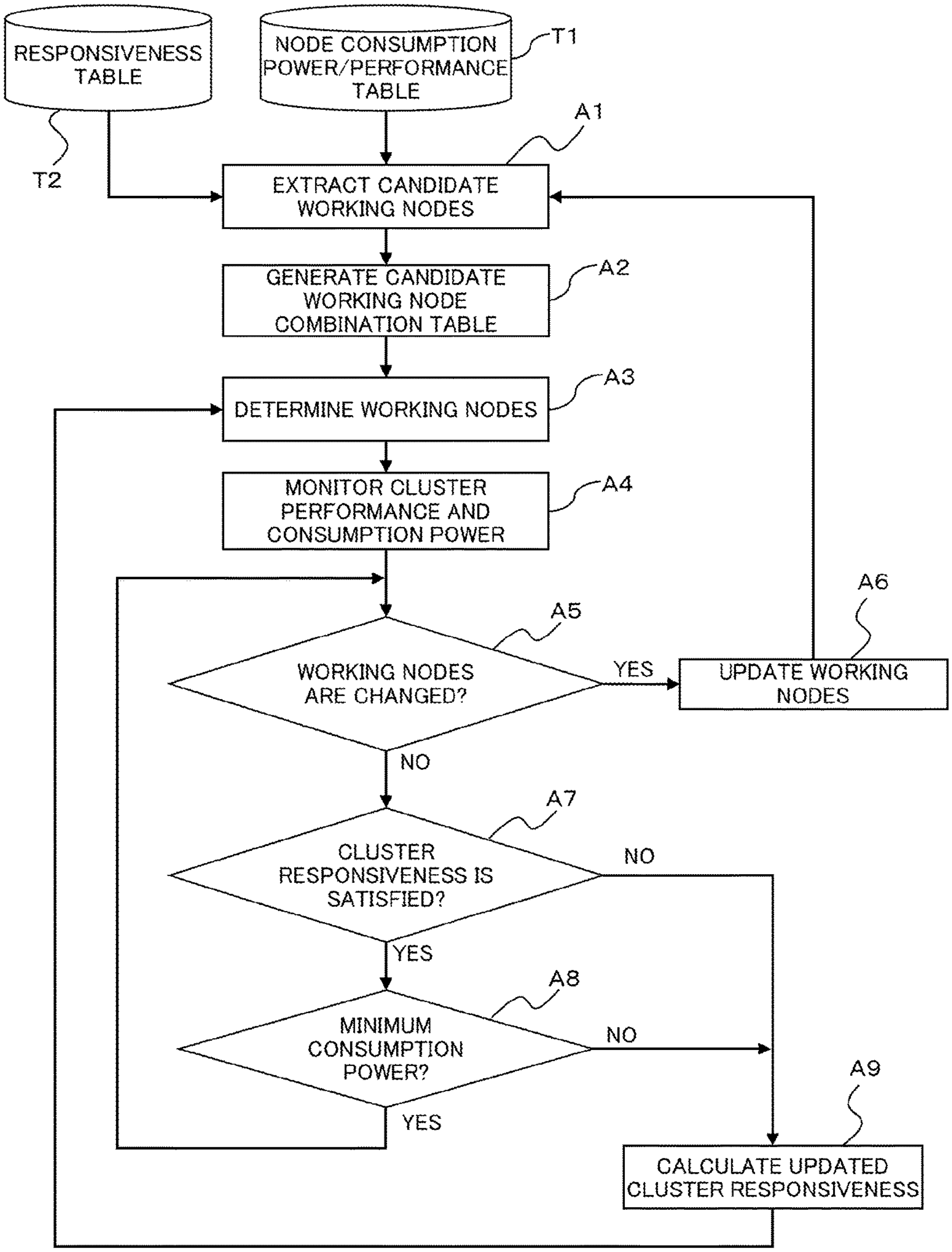
FIG. 8 is a flow diagram denoting a succession of procedural steps of a basic process performed in a cluster system according to an example of the first embodiment.

(B) Description of Operation:

Next, description will now be made in relation to a basic processing of the cluster system 1 having the above configuration according to an example of the first embodiment with reference to a flow diagram (steps A1-A9) of FIG. 8.

In step A1, the candidate working node extractor 12 reads the consumption power and the performance value of each node 30 for each CPU utilization from the node consumption power/performance table T1 and also reads the responsiveness table T2.

In step A2, the candidate working node extractor 12 generates the candidate working node table T4 using the obtained information.

In step A3, the working node determiner 13 determines the CPU utilization of each node 30 in accordance with the state of working the cluster 3 by referring to the responsiveness table T2 and the candidate working node table T4. Specifically, the working node determiner 13 extracts a combination of CPU utilizations which satisfies the cluster responsiveness registered in the responsiveness table T2 and also has the lowest consumption power among the combinations of CPU utilizations registered in the candidate working node table T4, and obtains the working node table number associated with the extracted combination. This determines the nodes 30 constituting the cluster 3 and the CPU utilizations at which the respective nodes are to be operated.

In step A4, the cluster responsiveness monitor 16 measures the responsiveness of the cluster 3, and cluster consumption power monitor 15 obtains and monitors the consumption power of the cluster 3.

In step A5, the candidate working node extractor 12 confirms whether the node configuration of the nodes 30 constituting the cluster 3 is changed. For example, if the monitoring by the node responsiveness monitor 17 finds that one of the nodes 30 degrades its processing performance for any reason and the response time of the node 30 does not satisfy the node responsiveness of responsiveness table T2, the configuration of the cluster 3 is changed by disconnecting the node 30 from the cluster 3.

In contrast, the monitoring by the node responsiveness monitor 17 finds that the processing performance of a node 30 which has been disconnected from the cluster 3 improves to have the response time satisfying the node responsiveness of the responsiveness table T2, the configuration of the cluster 3 is changed by incorporating the node 30 into the cluster 3.

If the configuration of the working nodes is changed (see YES route in step A5), the nodes 30 constituting the cluster 3 are updated in step A6 and the process returns to step A1. Then the candidate working node extractor 12 collects information of a node 30 newly incorporated in the cluster 3 in step A1 and generates the candidate working node table T4 based on the new node configuration.

In contrast, if the working nodes are not changed (see NO route in step A5), the cluster responsiveness monitor 16 confirms whether the cluster 3 satisfies the cluster responsiveness in step A7. Specifically, the cluster responsiveness monitor 16 measures the cluster responsiveness and determines whether the observed cluster responsiveness is included in the allowable range of the cluster responsiveness registered in the responsiveness table T2.

If the observed cluster responsiveness satisfies the cluster responsiveness (see YES route in step A7), the cluster responsiveness monitor 16 determines whether the observed cluster responsiveness is associated with the minimum consumption power in the candidate working node table T4 (step A8). Namely, the cluster responsiveness monitor 16 determines whether the combination of CPU utilizations that consumes less power is present in the candidate working node table T4.

If the observed responsiveness is associated with the lowest consumption power in the candidate working node table T4 (see YES route in step A8), the process returns to step A5.

In contrast, if the observed cluster responsiveness does not satisfy the cluster responsiveness (see NO route in step A7), the cluster responsiveness monitor 16 calculates an updated cluster responsiveness in step A9. Then the cluster responsiveness monitor 16 extracts a combination which satisfies the updated cluster responsiveness and also has the minimum total consumption power from the candidate working node table T4, and obtains the working node table number associated with the extracted combination. Then the process returns to step A3.

Furthermore, if the observed responsiveness is not associated with the minimum consumption power in the candidate working node table T4 (see NO route in step A8), the process moves to step A9.

Figure 9:
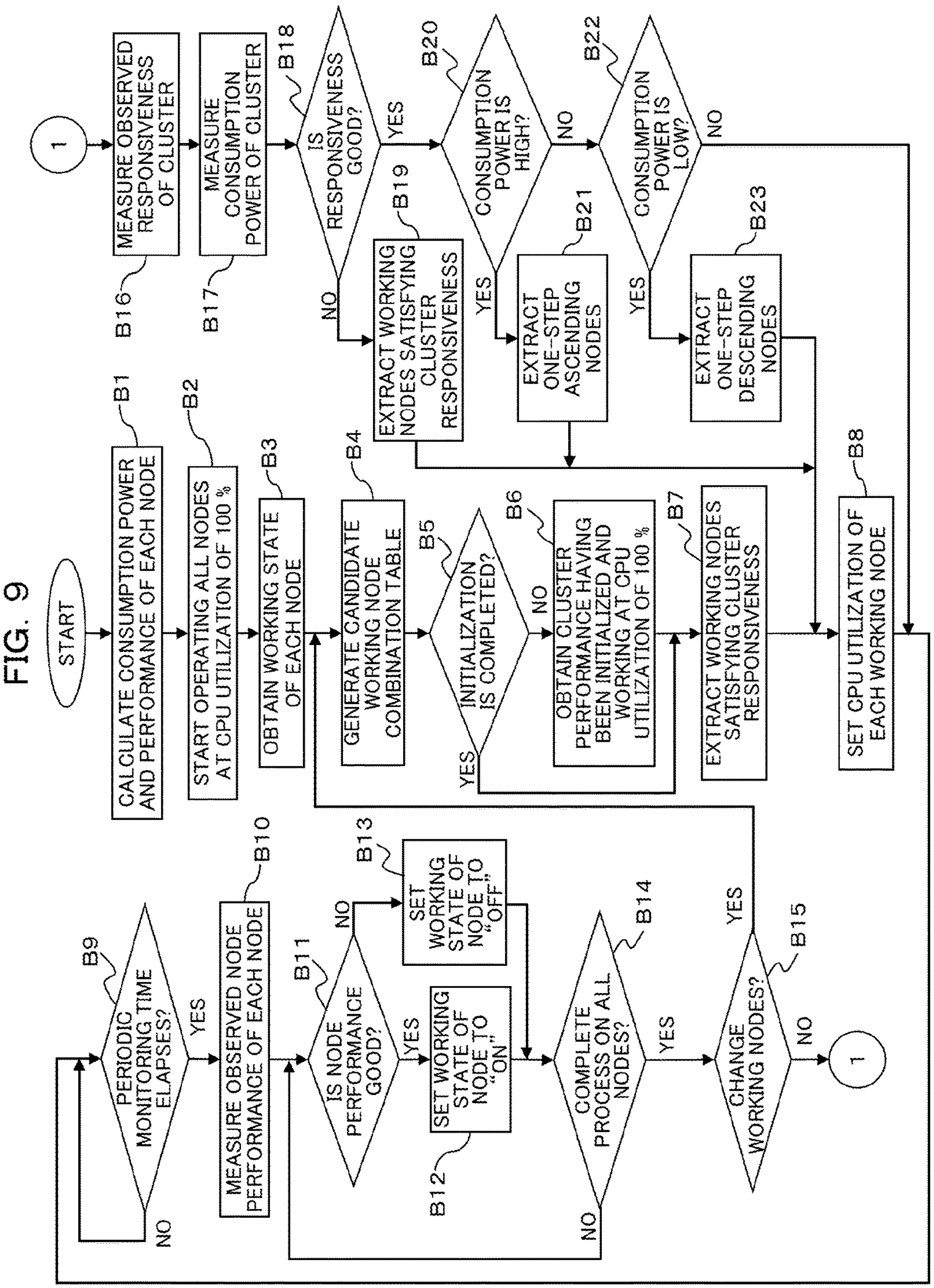
FIG. 9 is a flow diagram denoting a succession of detailed procedural steps performed in a cluster system according to an example of the first embodiment.

Next, description will now be made in relation to the detailed processing in the cluster system 1 according to an example of the first embodiment with reference to the flow diagram (steps B1-B23) of FIG. 9.

In step B1, the candidate working node extractor 12 reads the consumption power and the performance value of each node 30 for each CPU utilization from the node consumption power/performance table T1 and also reads the responsiveness table T2. Then the candidate working node extractor 12 obtains an expression of an approximation curve representing the relationship between the consumption power and the performance value of each node 30 using the obtained information.

Next, in step B2, the candidate working node extractor 12 instructs, via the node power controller 14, all the candidate working nodes to operate at CPU utilization of 100% (heavy load). In step B3, the node responsiveness monitor 17 confirms whether the response time of each node 30 under a state of operating at the CPU utilization of 100% satisfies the node responsiveness registered in the responsiveness table T2, and on the basis of the result of confirmation, sets "ON" or "OFF" in the state of working in the candidate working node table T3 for the node 30.

If the measured response time of a node 30 does not satisfy the node responsiveness, the state of working of the node 30 is set to be "OFF" in the candidate working node table T3 and the node 30 is disconnected from the cluster 3.

In step B4, the candidate working node extractor 12 generates the candidate working node table T4.

In step B5, the candidate working node extractor 12 confirms whether the initialized flag of the candidate working node table T3 is "ON", in other words, whether the candidate working node table T3 has been initialized.

If the candidate working node table T3 has not been initialized (see NO route in step B5), the candidate working node extractor 12 sets the initialize flag in the candidate working node table T3 to be "ON". In addition, the candidate working node extractor 12 causes the cluster responsiveness monitor 16 to obtain the observed cluster responsiveness under a state where the nodes 30 constituting the cluster 3 are operating at the CPU utilization of 100%.

In step B7, the working node determiner 13 determines the CPU utilization of each node 30 in accordance with the state of working of the cluster 3 by referring to the responsiveness table T2 and the candidate working node table T4. Specifically, among the combinations of the CPU utilizations registered in the candidate working node table T4, the working node determiner 13 extracts a combination which satisfies the cluster responsiveness registered in the responsiveness table T2 and which also has the lowest total consumption power, and obtains the working node table number associated with the extracted combination.

In step B8, the node power controller 14 notifies the nodes 30 of the respective CPU utilization determined by the working node determiner 13. The nodes 30 control their consumption power in accordance with the notified CPU utilizations, using the power capping function.

In the step B9, the node responsiveness monitor 17 confirms whether the predetermined periodic monitoring interval has been elapsed and waits until the periodic monitoring interval elapses (see NO route in step B9).

When the periodic monitoring interval elapses (see YES route in step B9, the node responsiveness monitor 17 notifies all the nodes 30 of the node responsiveness monitoring job and measures the response times (node performances) from the respective nodes 30 after the issue of the node responsiveness monitoring job in step B10.

In step B11, the node responsiveness monitor 17 compares the observed node performance of each node 30 with the node responsiveness registered in the responsiveness table T2 to confirm whether the node 30 satisfies the node responsiveness.

If the node 30 does not satisfy the node responsiveness (see NO route in step B11), the node responsiveness monitor 17 sets the state of working of the same node 30 in the candidate working node table T3 to be "OFF" (step B13). In contrast, if the node 30 satisfies the node responsiveness (see YES route in step B11), the node responsiveness monitor 17 sets the state of working of the same node 30 in the candidate working node table T3 to be "ON" (step B12).

In step B14, the node responsiveness monitor 17 confirms whether all the nodes 30 undergo steps B11-B13. If some of the nodes 30 does not undergo steps B11-B13 (see NO route in step B14), the process returns to step B11.

If all the nodes 30 undergo steps B11-B13 (see YES route in step B14), a confirmation is made as to whether the configuration of the working nodes is changed (step B15). If the configuration of the working nodes is changed (see YES route in step B15), the process returns to step B4 to generate the candidate working node table T4.

If the configuration of the working nodes is not changed (see NO route in step B15), the cluster responsiveness monitor 16 measures the performance (observed cluster responsiveness) of the cluster 3 in step B16. In addition, the cluster consumption power monitor 15 measures the consumption power of the cluster 3 in step B17.

In step B18, a determination is made as to whether the value of the observed cluster responsiveness measured by the cluster responsiveness monitor 16 satisfies the cluster responsiveness of the responsiveness table T2. In this determination, the cluster responsiveness monitor 16 determines whether the value of the observed cluster responsiveness is included in a predetermined range (e.g., ±10%) centered at the cluster responsiveness of the responsiveness table T2.

If the value of the observed cluster responsiveness measured by the cluster responsiveness monitor 16 does not satisfy the cluster responsiveness of the responsiveness table T2 (see NO route in step B18), the cluster responsiveness monitor 16 calculates an updated cluster responsiveness in step B19. The cluster responsiveness monitor 16 extracts a combination of CPU utilizations satisfying the calculated updated cluster responsiveness and having the lowest consumption power, obtains the working node table number associated with the extracted combination, and returns to step B8.

If the value of the observed cluster responsiveness satisfies the cluster responsiveness of the responsiveness table T2 (see YES route in step B18), the cluster responsiveness monitor 16 determines whether the observed cluster consumption power is higher than the total consumption power of the contiguous working node table number larger by one than that associated with the extracted combination in the candidate working node table T4 in step B20.

If the observed cluster consumption power is higher than the total consumption power of the one-step-ascending working node table number (see YES route in step B20), the cluster responsiveness monitor 16 obtains the one-step-ascending node table number (set of load setting values) (i.e., table shift) in step B21 and returns to step B8.

If the observed cluster consumption power is equal to or lower than the total consumption power of the one-step-ascending working node table number (see NO route in step B20), the cluster responsiveness monitor 16 further determines whether the observed cluster consumption power is lower than the total consumption power of the contiguous working node table number smaller by one than that associated with the extracted combination in the candidate working node table T4 in step B22.

If the observed cluster consumption power is lower than the total consumption power of the one-step-descending working node table number (see YES route in step B22), the cluster responsiveness monitor 16 obtains the one-stepdescending node table number (set of load setting values) (i.e., table shift) in step B23 and returns to step B8.

If the observed cluster consumption power is equal to or higher than the total consumption power of the one-step-descending working node table number (see NO route in step B22), the process moves to step B9.

(C) Effects:

According to the cluster system 1 of an example of the first embodiment, the candidate working node extractor 12 generates the candidate working node table T4 in which an total consumption power, an total performance, and a cluster responsiveness when the nodes are operated at respective CPU utilizations are associated with one another for each combination of the CPU utilizations. The working node determiner 13 selects a combination of CPU utilizations leading to satisfaction of the cluster responsiveness defined in the responsiveness table T2 and also to the lowest total consumption power among the combination of CPU utilizations registered in the candidate working node table T4. Then the node power controller 14 causes the nodes 30 to operate at the respective CPU utilizations of the selected combination.

This makes the multiple nodes 30 constituting the cluster 3 possible to operate at respective CPU utilizations satisfying the required performances (i.e., cluster responsiveness, node responsiveness) and also minimizing the consumption power. Namely, it is possible to reduce the consumption power, concurrently satisfying the required performance.

Even in cases where working environment of the cluster 3 changes because, for example, the performance of a node deteriorates due to interference between nodes or a failure of the node or because anode is to be replaced for regular maintenance, it is possible to satisfy the required performance and also consumes less power.

The cluster responsiveness monitor 16 periodically monitors the responsiveness of each node 30 and, on the basis of the response time to the issued node responsiveness monitoring job, sets the state of working of the node 30 to be "ON" or "OFF" in the candidate working node table T3. This makes the cluster 3 possible to consist only of nodes 30 having requisite node responsiveness. As a result, such dynamic change of the configuration of the cluster 3 makes it possible to maintain the performance of the cluster 3.

The cluster responsiveness monitor 16 monitors the observed cluster responsiveness and, if the observed cluster responsiveness is not included in the allowable range of the cluster responsiveness in the responsiveness table T2, calculates the updated cluster responsiveness. Then the cluster responsiveness monitor 16 obtains the working node table number which satisfies the updated cluster responsiveness and which also has the lowest consumption power from the candidate working node table T4. This can operate the nodes 30 constituting the cluster 3 at a combination of the CPU utilizations that satisfies the cluster responsiveness, so that the cluster 3 can work so as to satisfy the cluster responsiveness.

If the observed cluster responsiveness monitor 16 satisfies the cluster responsiveness and the observed cluster consumption power is higher than the total consumption power of the contiguous working node table number larger by one than that associated with the currently-achieved combination in the candidate working node table T4, the cluster responsiveness monitor 16 sets the contiguous working node table number. In addition, if the observed cluster responsiveness satisfies the cluster responsiveness and the observed cluster consumption power is lower than the total consumption power of the contiguous working node table number smaller by one than that associated with the currently-achieved combination in the candidate working node table T4, the cluster responsiveness monitor 16 sets the contiguous working node table number. This can reduce the consumption power of the cluster 3.

In the above first embodiment, the candidate working node table T4 includes a set of load setting values having a cluster responsiveness that does not satisfy the required specification defined in the responsiveness table T2. Accordingly, there is a possibility that when the one-step ascending or descending set of load setting values is selected (table shift) in step B21 or B23, the set of load setting values selected in the shifting does not satisfy the cluster responsiveness.

As a solution to the above, the node responsiveness monitor 17 periodically monitors the node performance in step B9, and in cases where the cluster responsiveness is not satisfied in steps B16 and B18, the updated cluster responsiveness is calculated in step B19 and the process moves to step B8, so that the cluster responsiveness is finally satisfied without any influence.

Various changes and modifications can be suggested without departing from the spirit of the above first embodiment.

For example, in generating the candidate working node table T4, the candidate working node extractor 12 may remove a set of load setting value that does not satisfy the cluster responsiveness registered in the responsiveness table T2 from the candidate working node table T4.

Those ordinarily skilled in the art can carry out and generate the foregoing embodiment by referring to the above disclosure.

According to the above first embodiment, it is possible to satisfy the required performance and also reduce the consumption power.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A cluster system comprising a plurality of nodes and a controller that controls power consumption of the plurality of nodes and that includes a memory and a processor, the memory stores reference information in which an estimated power consumption and an estimated performance of a cluster including two or more candidate nodes among the plurality of nodes when the candidate nodes are assumed to be operated at respective load setting values are associated with each other for each of a plurality of combinations of the respective load setting values of the candidate nodes;

the processor:

selects a combination of the respective load setting values of the candidate nodes, the combination leading to the estimated performance satisfying a required performance for the cluster and having the lowest power consumption, by referring to the reference information stored in the memory; and notifies each of the candidate nodes of the load setting value associated with the candidate node at the combination of the respective load setting values selected, and each of the candidate nodes controls power consumption in accordance with the load setting value notified by the processor.

2. The cluster system according to claim 1, wherein when the candidate nodes is changed, the processor regenerates the reference information for the changed candidate nodes;

selects a combination of the respective load setting values of the changed candidate nodes by referring to the regenerated reference information; and notifies each of the candidate node of the load setting value associated with the candidate node at the combination of the respective load setting values selected, and each of the candidate nodes controls power consumption in accordance with the load setting value notified by the processor.

3. The cluster system according to claim 2, wherein the processor further:

measures a node performance of each of the plurality of the nodes;

selects the candidate nodes according to whether the node performance measured satisfies a required performance; and when the selection of the candidate nodes changes the candidate nodes included in the cluster, regenerates the reference information for the changed candidate nodes, selects a combination of the respective load setting values of the changed candidate nodes by referring to the regenerated reference information, and notifies each of the candidate node of the load setting value associated with the candidate node at the combination of the respective load setting values selected, and causes each of the candidate nodes to control power consumption in accordance with the load setting value notified by the processor.

4. The cluster system according to claim 3, wherein the processor excludes a node having the node performance not satisfying the required performance from the candidate nodes.

5. The cluster system according to claim 4, wherein the processor periodically measures the node performance of each of the plurality of the nodes.

6. The cluster system according to claim 1, wherein the processor further:

measures a processing performance of the cluster; and when the processing performance of the cluster does not satisfy a required performance, reselects a combination of the respective load setting values of the candidate nodes by referring to the reference information, notifies each of the candidate node of the load setting value associated with the candidate node at the combination of the respective load setting values reselected, and each of the candidate nodes controls power consumption in accordance with the load setting value notified by the processor.

7. The cluster system according to claim 1, wherein the processor further:

measures a power consumption of the cluster under a state where the candidate nodes are operated at the combination of the respective load setting values selected; and when the cluster power consumption measured is higher than a contiguous estimated power consumption one-step higher than the estimated power consumption of the selected combination in an order of the estimated power consumption in the reference information, selects a combination of the respective load setting values corresponding to the contiguous estimated power consumption, and operates the candidate nodes notifies each of the candidate node of the load setting value associated with the candidate node at the combination of the respective load setting values selected, and each of the candidate nodes controls power consumption power in accordance with the load setting value notified by the processor.

8. The cluster system according to claim 1, wherein the processor further:

measures a power consumption of the cluster under a state where the candidate nodes are operated at the combination of the respective load setting values selected, wherein when the cluster power consumption measured is lower than a contiguous estimated power consumption one-step lower than the estimated power consumption of the selected combination in an order of the estimated power consumption in the reference information, selects a combination of the respective load setting values corresponding to the contiguous estimated power consumption, and notifies each of the candidate nodes of the load setting value associated with the candidate node at the combination of the respective load setting values selected, and each of the candidate nodes controls power consumption in accordance with the load setting value notified by the processor.

9. A controller that controls power consumption of a plurality of nodes included in a cluster, the controller comprising a memory and a processor:

the memory stores reference information in which an estimated power consumption and an estimated performance of a cluster including two or more candidate nodes among the plurality of nodes when the candidate nodes are assumed to be operated at respective load setting values are associated with each other for each of a plurality of combinations of the respective load setting values of the candidate nodes; and the processor selects a combination of the respective load setting values of the candidate nodes, the combination leading to the estimated performance satisfying a required performance for the cluster and having the lowest power consumption, by referring to the reference information stored in the memory, notifies each of the candidate nodes of the load setting value associated with the candidate node at the combination of the respective load setting values selected, and causes the candidate nodes to control power consumption in accordance with the load setting value notified by the processor.

10. The controller according to claim 9, wherein the processor:

when the candidate nodes is changed, regenerates the reference information for the changed candidate nodes;

selects a combination of the respective load setting values of the changed candidate nodes by referring to the regenerated reference information;

notifies each of the candidate nodes of the load setting value associated with the candidate node at the combination of the respective load setting values selected; and causes the candidate nodes to control power consumption in accordance with the load setting value notified by the processor.

11. The controller according to claim 10, wherein the processor further:

measures a node performance of each of the plurality of the nodes;

selects the candidate nodes according to whether the node performance measured by the node performance measure satisfies a required performance; and when the selection of the candidate nodes by the node selector changes the candidate nodes included in the cluster, regenerates the reference information for the changed candidate nodes, selects a combination of the respective load setting values of the changed candidate nodes by referring to the regenerated reference information, notifies each of the candidate nodes of the load setting value associated with the candidate node the combination of the respective load setting values selected, and causes the candidate nodes to control power consumption in accordance with the load setting value notified by the processor.

12. The controller according to claim 11, wherein the processor excludes a node having the node performance not satisfying the required performance from the candidate nodes.

13. The controller according to claim 11, wherein the processor periodically measures the node performance of each of the plurality of the nodes.

14. The controller according to claim 9, wherein the processor further:

measures a processing performance of the cluster; and when the processing performance of the cluster does not satisfy a required performance, reselects a combination of the respective load setting values of the candidate nodes by referring to the reference information, and notifies each of the candidate nodes of the load setting value associated with the candidate node at the combination of the respective load setting values reselected, and causes the candidate nodes to control consumption in accordance with the load setting value notified by the processor.

15. The controller according to claim 9, wherein the processor further:

measures a power consumption of the cluster under a state where the candidate nodes are operated at the combination of the respective load setting values selected by the load setting value selector; and when the cluster power consumption measured is higher than a contiguous estimated power consumption one-step higher than the estimated power consumption of the selected combination in an order of the estimated power consumption in the reference information, selects a combination of the respective load setting values corresponding to the contiguous estimated power consumption, and notifies each of the candidate nodes of the load setting value associated with the candidate node at the combination of the respective load setting values selected, and causes the candidate nodes to control power consumption in accordance with the load setting value notified by the processor.

16. The controller according to claim 9, wherein the processor further:

measures a power consumption of the cluster under a state where the candidate nodes are operated at the combination of the respective load setting values selected; and when the cluster power consumption measured is lower than a contiguous estimated power consumption one-step lower than the estimated power consumption of the selected combination in an order of the estimated power consumption in the reference information, the load setting value selector selects a combination of the respective load setting values corresponding to the contiguous estimated power consumption, notifies each of the candidate nodes of the load setting value associated with the candidate node at the combination of the respective load setting values selected, and causes the candidate nodes to control consumption power in accordance with the load setting value notified by the processor.

17. A method of controlling, by a controller comprising a memory and a processor, a plurality of nodes included in a cluster, the method comprising:

at the processor generating reference information in which an estimated power consumption and an estimated performance of a cluster including two or more candidate nodes among the plurality of nodes when the candidate nodes are assumed to be operated at respective load setting values are associated with each other for each of a plurality of combinations of the respective load setting values of the candidate nodes and storing the reference information into the memory;

selecting a combination of the respective load setting values of the candidate nodes, the combination leading to the estimated performance satisfying a required performance for the cluster and having the lowest power consumption, by referring to the reference information stored in the memory; and notifying each of the candidate nodes of the load setting value associated with the candidate node at the selected combination of the respective load setting values, and causing the candidate nodes to control power consumption in accordance with the load setting value notified.

18. A non-transitory recording medium having stored therein a program for controlling a plurality of nodes included in a cluster, the program causing a processor to execute a process comprising:

generating reference information in which an estimated power consumption and an estimated performance of a cluster including two or more candidate nodes among the plurality of nodes when the candidate nodes are assumed to be operated at respective load setting values are associated with each other for each of a plurality of combinations of the respective load setting values of the candidate nodes;

selecting a combination of the respective load setting values of the candidate nodes, the combination leading to the estimated performance satisfying a required performance for the cluster and having the lowest power consumption, by referring to the reference information; and notifying each of the candidate nodes of the load setting value associated with the candidate node an operation controller that operates the candidate nodes at the selected combination of the respective load setting values, and causing the candidate nodes to control consumption in accordance with the load setting value notified by the processor.

19. The non-transitory recording medium according to claim 18, wherein the process further comprising:

when the candidate nodes included in the cluster is changed, regenerating the reference information for the changed candidate nodes, selecting a combination of the respective load setting values of the changed candidate nodes by referring to the regenerated reference information, and notifying each of the candidate nodes of the load setting value associated with the candidate node at the combination of the respective load setting values selected, and causing the candidate nodes to control consumption power in accordance with the load setting value notified.

20. The non-transitory recording medium according to claim 18, wherein the process further comprising:

measuring a node performance of each of the plurality of the nodes; and selecting the candidate nodes according to whether the node performance measured by the node performance measure satisfies a required performance; and when the selection of the candidate nodes by the node selector changes the candidate nodes, generating the reference information for the changed candidate nodes, selecting a combination of the respective load setting values of the changed candidate nodes by referring to the reference information, notifying each of the candidate nodes of the load setting value associated with the candidate node at the combination of the respective load setting values selected, and causing the candidate nodes to control consumption in accordance with the load setting value notified.

* * * * *